United States Patent
Alqurashi et al.

(10) Patent No.: US 11,827,534 B2
(45) Date of Patent: Nov. 28, 2023

(54) INCINERATOR SYSTEM FOR ON-SITE COMPLETION FLUID REMOVAL AND METHODS OF USING THE SAME

(71) Applicant: Saudi Arabian Oil Company, Dhahran (SA)

(72) Inventors: Mahmoud A. Alqurashi, Dhahran (SA); Ossama R. Sehsah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/961,343

(22) Filed: Oct. 6, 2022

(65) Prior Publication Data

US 2023/0054521 A1 Feb. 23, 2023

Related U.S. Application Data

(62) Division of application No. 16/995,904, filed on Aug. 18, 2020, now Pat. No. 11,492,269.

(51) Int. Cl.
*C02F 1/04* (2023.01)
*B01D 1/00* (2006.01)
(Continued)

(52) U.S. Cl.
CPC ............ *C02F 1/048* (2013.01); *B01D 1/0023* (2013.01); *B01D 1/0082* (2013.01); *C02F 1/008* (2013.01);
(Continued)

(58) Field of Classification Search
CPC ...... C02F 1/008; C02F 1/048; C02F 2101/12; C02F 2101/34; C02F 2103/10;
(Continued)

(56) References Cited

U.S. PATENT DOCUMENTS

| | | | |
|---|---|---|---|
| 1,794,045 | A | 2/1931 | Warner |
| 1,998,732 | A | 4/1935 | Olds |
| 3,918,411 | A | 11/1975 | Wolowodiuk |
| 4,357,520 | A | 11/1982 | Taylor |

(Continued)

FOREIGN PATENT DOCUMENTS

| | | |
|---|---|---|
| CA | 2848572 A1 | 10/2015 |
| DE | 2519545 A1 | 11/1976 |

OTHER PUBLICATIONS

International Search Report and Written Opinion dated Dec. 14, 2021 pertaining to International Application No. PCT/US2021/046215, filed Aug. 17, 2021, 13 pages.

*Primary Examiner* — Jonathan Miller
(74) *Attorney, Agent, or Firm* — DINSMORE & SHOHL LLP

(57) ABSTRACT

An incinerator system includes an evaporator tank having a fluid inlet, a steam vent, and an evaporation cavity and a heating assembly having a plurality of heating rods mounted on a rod spacing mechanism and disposed in the evaporation cavity of the evaporator tank. The rod spacing mechanism is configured to move the plurality of heating rods within the evaporation cavity. The incinerator system also includes a sensor system having a plurality of sensors positioned to perform one or more sensor measurements in the evaporation cavity and a programmable logic controller communicatively coupled to the sensor system and the heating assembly. The programmable logic controller is configured to instruct the rod spacing mechanism to move at least one of the plurality of heating rods based on the one or more sensor measurements.

9 Claims, 3 Drawing Sheets

(51) Int. Cl.
*C02F 1/00* (2023.01)
*C02F 101/12* (2006.01)
*C02F 101/34* (2006.01)
*C02F 103/10* (2006.01)
*E21B 41/00* (2006.01)

(52) U.S. Cl.
CPC ...... *C02F 2101/12* (2013.01); *C02F 2101/34* (2013.01); *C02F 2103/10* (2013.01); *C02F 2209/005* (2013.01); *C02F 2209/02* (2013.01); *C02F 2209/40* (2013.01); *E21B 41/00* (2013.01)

(58) Field of Classification Search
CPC ............ C02F 2209/005; C02F 2209/02; C02F 2209/40; B01D 1/0023; B01D 1/0082
See application file for complete search history.

(56) References Cited

U.S. PATENT DOCUMENTS

| | | |
|---|---|---|
| 4,621,186 A | 11/1986 | Taylor et al. |
| 5,359,692 A | 10/1994 | Alix et al. |
| 5,934,207 A | 8/1999 | Echols et al. |
| 7,513,972 B2 | 4/2009 | Hart et al. |
| 7,614,367 B1 | 11/2009 | Frick |
| 8,771,477 B2 | 7/2014 | Thiers |
| 9,309,129 B1 | 4/2016 | Zeitoun et al. |
| 9,393,502 B1 | 7/2016 | Zeitoun et al. |
| 9,802,836 B2 | 10/2017 | Theirs |
| 9,802,845 B2 | 10/2017 | Thiers |
| 11,136,868 B1 | 10/2021 | Alqurashi et al. |
| 11,492,269 B2 * | 11/2022 | Alqurashi ............ B01D 1/0082 |
| 2014/0263081 A1 | 9/2014 | Thiers |
| 2014/0299462 A1 | 10/2014 | Thiers |

* cited by examiner

INCINERATOR SYSTEM FOR ON-SITE COMPLETION FLUID REMOVAL AND METHODS OF USING THE SAME

CROSS-REFERENCE TO RELATED APPLICATIONS

The present application is a divisional application of U.S. patent application Ser. No. 16/995,904 filed Aug. 18, 2020, the entire contents of which is incorporated by reference in the present disclosure.

BACKGROUND

Field

The present specification generally relates to methods for managing and incinerating a completion fluid during oil well construction and testing.

Technical Background

During oil well construction, once a target depth of the oil well is reached, a completion fluid is used to assist with the final operations prior to initiation of production. These final operations may include installing downhole hardware, such as screens, production liners, packers, and downhole valves. Completion fluid is used to control the oil well should the installation of this downhole hardware fail, preventing or reducing damage to the oil well and the downhole hardware. Once downhole hardware is installed, the oil well is cleaned and the health status of the oil well is tested.

The cleaning process includes removing the completion fluid. Completion fluid is often water based and is heavier than oil or gas. Thus, failing to remove the completion fluid may affect flaring efficiency during oil well operation and may even prevent flaring. This may lead to environmental impact, especially offshore, as the heavier completion fluid may carry hydrocarbons into the ocean. Currently, removed completion fluid is stored in storage tanks. However, storage tank space is limited on an oil rig. When the storage tanks are full, the cleaning process is paused to transport full storage tanks to shore and transport empty storage tanks back to the oil rig, increasing operation costs and oil well construction time.

Accordingly, there is a desire for systems and methods for improved management and disposal of completion fluid on-site.

SUMMARY

According to an embodiment of the present disclosure, an incinerator system includes an evaporator tank having a fluid inlet, a steam vent, and an evaporation cavity and a heating assembly having a plurality of heating rods mounted on a rod spacing mechanism and disposed in the evaporation cavity of the evaporator tank. The rod spacing mechanism is configured to move the plurality of heating rods within the evaporation cavity. The incinerator system also includes a sensor system having a plurality of sensors positioned to perform one or more sensor measurements in the evaporation cavity and a programmable logic controller communicatively coupled to the sensor system and the heating assembly. The programmable logic controller is configured to instruct the rod spacing mechanism to move at least one of the plurality of heating rods based on the one or more sensor measurements.

According to another embodiment of the present disclosure, a method of evaporating a completion fluid includes receiving the completion fluid through a fluid inlet and into an evaporation cavity of an evaporator tank, the evaporator tank having a steam vent, and heating the completion fluid in the evaporation cavity using a heating assembly having a plurality of heating rods mounted on a rod spacing mechanism and disposed in the evaporation cavity, thereby evaporating at least a portion of the completion fluid such that evaporated completion fluid escapes the evaporator tank through the steam vent. The heating assembly is communicatively coupled to a programmable logic controller and the method further includes measuring at least one fluid property of the completion fluid disposed in the evaporation cavity using a sensor system having a plurality of sensors communicatively coupled to the programmable logic controller and translating a position of at least one of the plurality of heating rods within the evaporation cavity using the rod spacing mechanism based on a fluid property measurement of the plurality of sensors thereby altering a localized temperature within the evaporation cavity.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
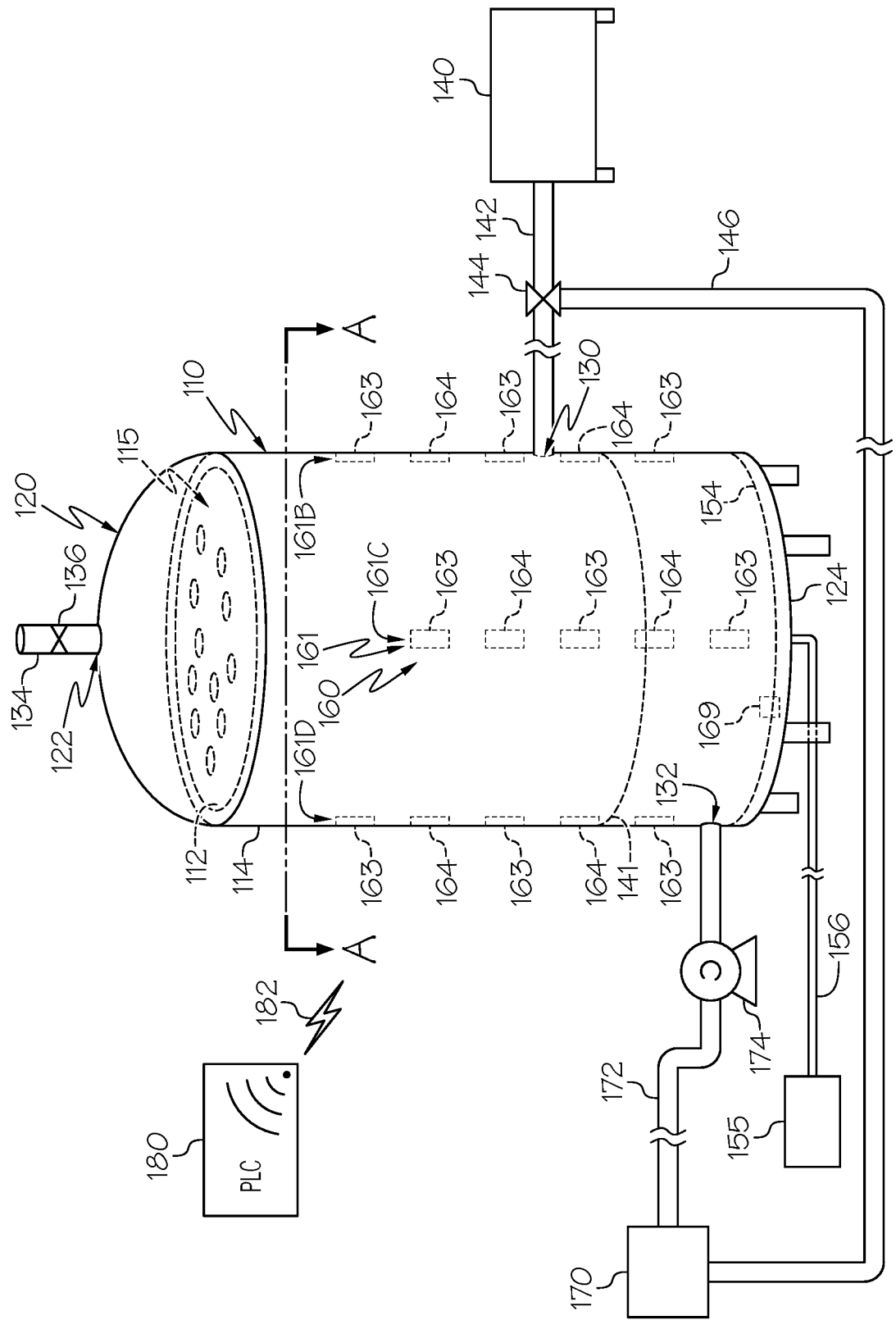
FIG. 1 schematically depicts an incinerator system comprising an evaporator tank, a sensor system, and a heating system, according to one or more embodiments shown and described herein.

Reference will now be made to a high efficiency incinerator system designed to super heat a brine/water completion fluid used during oil well construction. The incinerator system may assist with a cleanup operation without shutting down an active drilling operation. The incinerator system includes an evaporator tank having a fluid inlet, a waste outlet, a steam vent, and a heating assembly that includes a plurality of heating rods disposed in the evaporator tank. The incinerator system also includes a plurality of sensors communicatively coupled to a programmable logic controller (PLC) and positioned to perform a variety of sensor measurements to measure at least one fluid property of the completion fluid. The sensor measurements may be used to optimize the flow rate of completion fluid entering the evaporator tank and a temperature within the evaporator tank to achieve an optimum steaming condition. This optimization may be achieved by actively altering the spacing between the plurality of heating rods of the heating assembly. Embodiments of an incinerator system for evaporating the completion fluid will now be described and, whenever possible, the same reference numerals will be used throughout the drawings to refer to the same or like parts.

Referring now to FIG. 1, an incinerator system 100 comprising an evaporator tank 110, a heating assembly 150, a sensor system 160, and a programmable logic controller (PLC) 180 is schematically depicted. The evaporator tank 110 comprises an inner surface 112 facing an evaporation cavity 115 and an outer surface 114 opposite the inner surface 112. The evaporator tank 110 also comprises a fluid inlet 130, a waste outlet 132, and a steam vent 134 each fluidly coupled to the evaporation cavity 115. The fluid inlet 130 fluidly couples the evaporator tank 110 to a completion fluid source 140, for example using a fluid inlet pathway 142. In operation, a completion fluid 141 may be directed from the completion fluid source 140 into the evaporator tank 110 through the fluid inlet 130, such that the completion fluid 141 undergoes an evaporation process in the evaporator tank 110. The completion fluid 141 is a water-brine mixture. Example brines in the completion fluid 141 include chlorides, bromides and formates. Completion fluid 141 is used to control the oil well after the target depth of the oil well is reached, but is removed before operation of the oil well. Using the incinerator system 100 described herein, completion fluid 141 may be evaporated on site, minimizing the amount of waste product that needs to be removed from the drilling site and removing the need to transport storage tanks to shore when constructing off-shore oil well.

As depicted in FIG. 1, the fluid inlet pathway 142 extends between the completion fluid source 140 and the fluid inlet 130 of the evaporator tank 110 and a waste pathway 172 extends between the waste outlet 132 of the evaporator tank 110 and a waste reservoir 170. The waste outlet 132 provides an outlet for removing any solid waste remnants present in the evaporator tank 110 after the completion fluid 141 undergoes an incineration process. The waste remnants do not evaporate and instead gravitationally collect at the base 124 of the evaporator tank 110. The waste outlet 132 is positioned closer to the base 124 of the evaporator tank 110 than the fluid inlet 130 and thus near any waste remnants that collect at the base 124 during the incineration process. In some embodiments, a flushing pump 174 is fluidly coupled to the waste outlet 132. The flushing pump 174 may facilitate flow of waste remnants that collect in the evaporator tank 110 from the waste outlet 132 to the waste reservoir 170. For example, the flushing pump 174 may introduce a cleaning fluid into the evaporator tank 110, for example, though the waste outlet 132, and then removing the cleaning fluid together with waste remnants, for example, back through the waste outlet 132 and into the waste reservoir 170. Moreover, as most of the completion fluid 141 evaporates, the cleaning fluid and waste remnants have a lower total volume than the volume of completion fluid 141 introduced into the evaporator tank 110, reducing the storage needed to remove completion fluid 141 from the oil well.

In some embodiments, the fluid inlet 130 includes an inlet choke 131 and the waste outlet 132 includes a waste choke 133. The inlet choke 131 and the waste choke 133 are both actuatable to selectively alter the diameter of the fluid inlet 130 and the waste outlet 132, respectively, and optionally close the fluid inlet 130 and the waste outlet 132. Altering the diameter of the fluid inlet 130 may alter the flow rate of completion fluid 141 entering the evaporator tank 110 and may control the volume of the completion fluid 141 in the evaporator tank 110. In some embodiments, the incinerator system 100 may further comprise a bypass pathway 146 that provides a pathway between the completion fluid source 140 and the waste reservoir 170 that bypasses the evaporator tank 110. A bypass valve 144 fluidly couples the fluid inlet pathway 142 and the bypass pathway 146 and may be selectively actuated to direct completion fluid 141 into the evaporator tank 110 or directly into the waste reservoir 170. The bypass valve 144 and bypass pathway 146 provide the option of collecting the completion fluid 141 directly in the waste reservoir 170 without incinerating the completion fluid 141.

Figure 2:
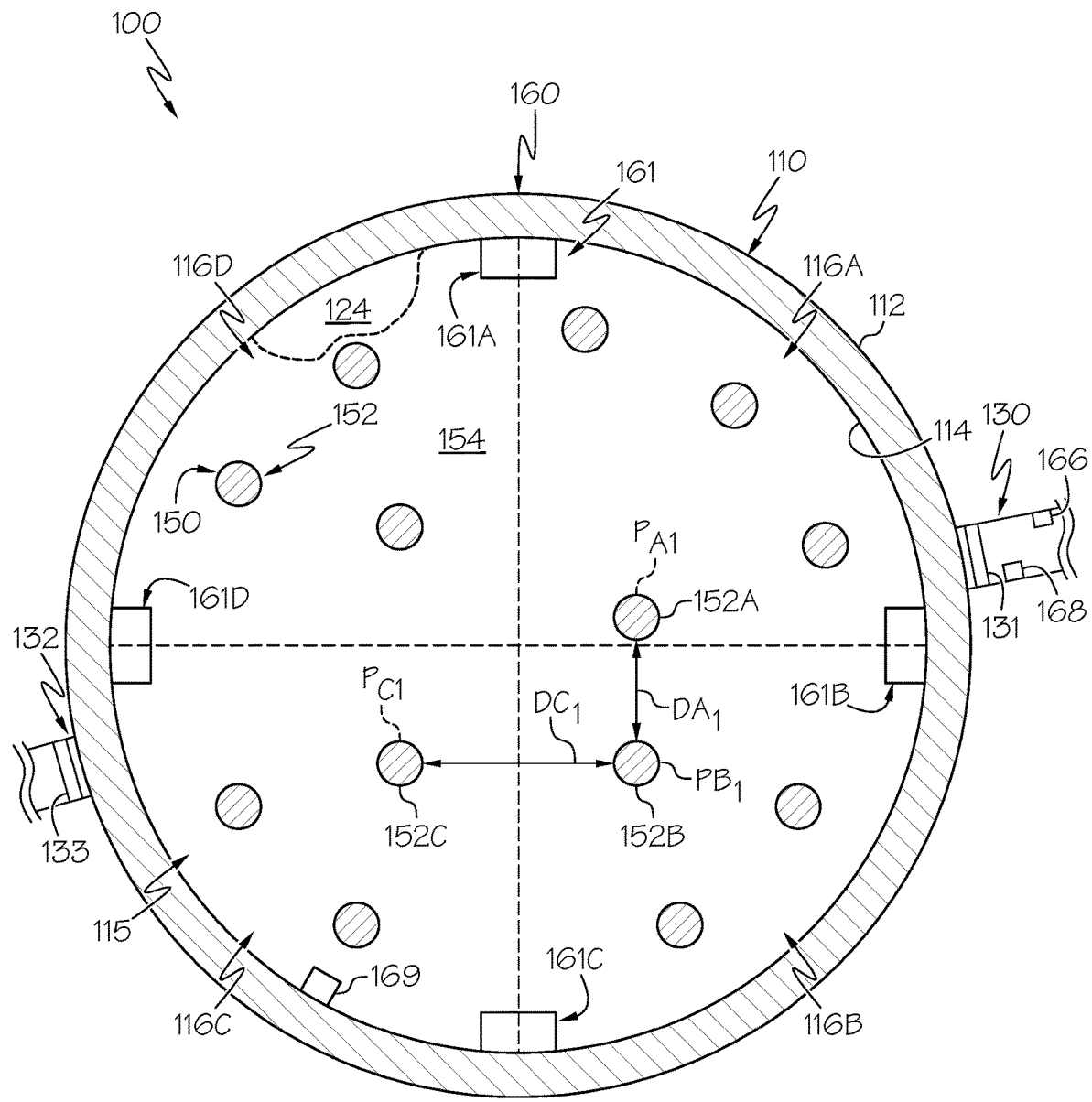
FIG. 2 schematically depicts a cross section of the evaporator tank along line A-A of FIG. 1, where a plurality of heating rods of the heating system are in a first arrangement, according to one or more embodiments shown and described herein.
Figure 3:
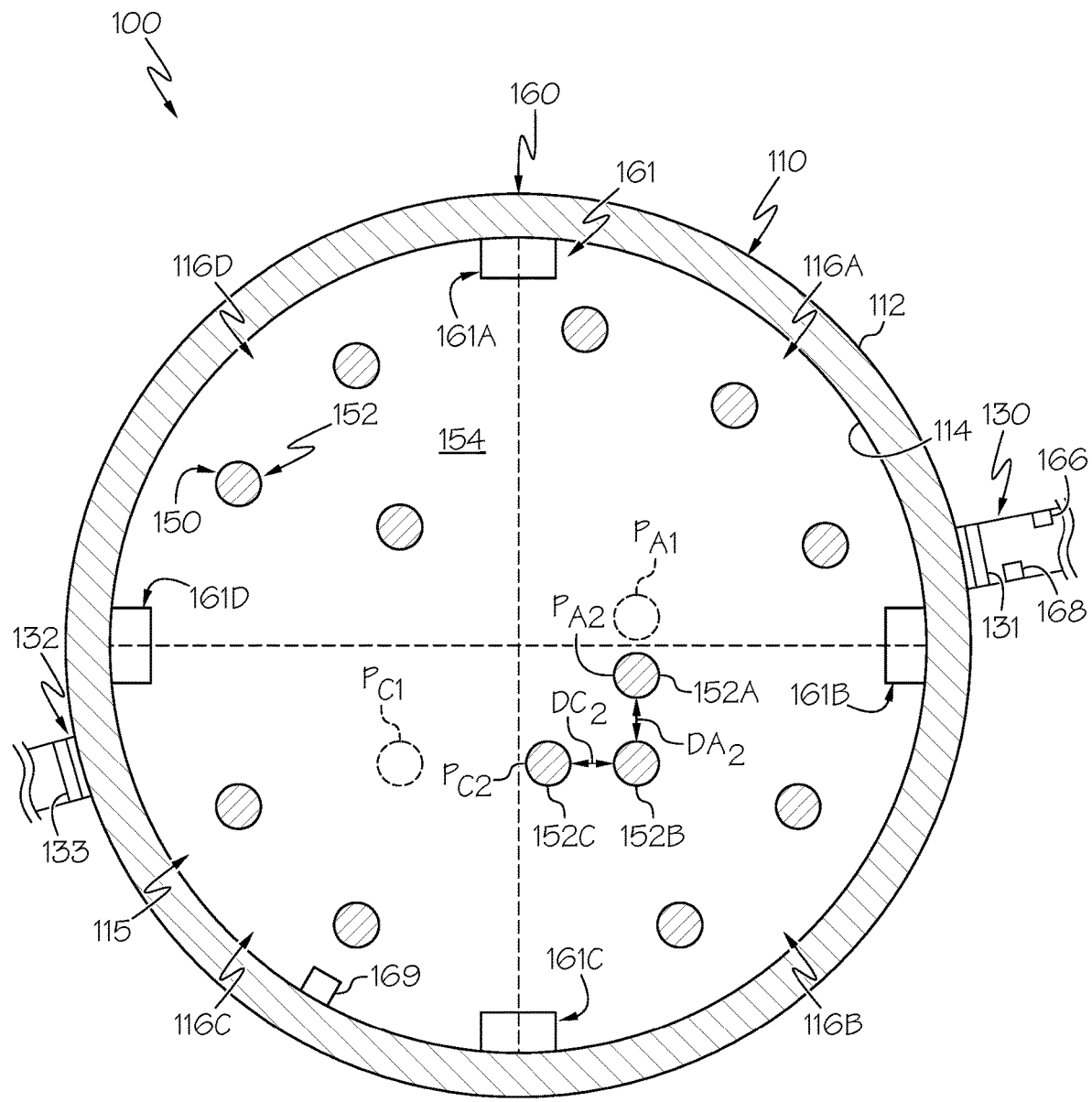
FIG. 3 schematically depicts a cross section of the evaporator tank along line A-A of FIG. 1, where the plurality of heating rods of the heating system are in a second arrangement, according to one or more embodiments shown and described herein.

Referring now to FIGS. 2 and 3, which depict a cross section of the evaporator tank 110 along line A-A of FIG. 1, the heating assembly 150 comprises a plurality of heating rods 152 mounted on a rod spacing mechanism 154, each disposed in the evaporation cavity 115. The rod spacing mechanism 154 is configured to move the plurality of heating rods 152 within the evaporation cavity 115 to selectively alter the distance between adjacent heating rods 152 of the plurality of heating rods 152. In some embodiments, the rod spacing mechanism 154 is a hydraulic piston mechanism. However, it should be understood that the rod spacing mechanism 154 may comprise any mechanism for laterally moving the plurality of heating rods 152. In some embodiments, the rod spacing mechanism 154 is configured to independently move each individual heating rod 152 in any lateral direction along an X-Y plane. By moving individual heating rods 152, the temperature of localized regions of the evaporation cavity 115 may be altered to optimize the energy feed and evaporation operation within the evaporation cavity 115. The plurality of heating rods 152 may comprise heating coils that generate heat by converting electrical energy into heat. The electrical energy supplied to the plurality of heating rods 152 may be generated by an energy source 155, such as a diesel generator, which is electrically coupled to the plurality of heating rods 152 by an electrical pathway 156.

Referring again to FIG. 1, the evaporator tank 110 comprises a chimney tower 120 that peaks at a chimney top 122 and a base 124 opposite the chimney tower 120. The base 124 forms a bottom portion of the evaporator tank 110 and the rod spacing mechanism 154 is positioned in the evaporation cavity 115 on the base 124. In some embodiments, as depicted in FIG. 1, the chimney tower 120 comprises a dome shape. The steam vent 134 extends through the chimney tower 120 at the chimney top 122. Thus, when the plurality of heating rods 152 evaporate the completion fluid 141, completion fluid vapor rises to the chimney top 122, reaching the steam vent 134. Moreover, the steam vent 134 comprises a venting valve 126, such as a pop-off valve, which seals the steam vent 134 until a certain pressure is reached in the evaporator tank 110 at which the venting valve 126 releases allowing steam to escape the evaporator tank 110.

Referring now to FIGS. 1-3, the sensor system 160 comprises a plurality of sensors 161 positioned to perform one or more sensor measurements in the evaporation cavity 115. For example, the plurality of sensors 162 may be positioned in the evaporation cavity 115 or within sensing range of the evaporation cavity 115. The sensor measurements measure fluid properties of the completion fluid 141. The plurality of sensors 161 comprise at least one temperature sensor 162, at least one pressure sensor 164, at least one flow sensor 166, at least one rheology sensor 168, and at least one volume sensor 169. Thus, the one or more sensor measurements may comprise a temperature measurement, a pressure measurement, a flow measurement, a rheology measurement, and a volume measurement. In some embodiments, the at least one temperature sensor 163 and the at least one pressure sensor 164 are positioned in the evaporation cavity 115. The flow sensor 166 and the rheology sensor 168 may each be positioned at the fluid inlet 130 and may measure the flow rate and the rheology of the completion fluid 141 entering the evaporation cavity 115 through the fluid inlet 130. Indeed, determining the rheology of the completion fluid 141 allows the PLC 180 to determine the specific heat capacity of the completion fluid 141 entering the evaporator tank 110. Further, the volume sensor 169 may be positioned in the evaporator cavity 115 or at the fluid inlet 130. While the flow sensor 166 and the rheology sensor 168 are depicted as distinct sensors in FIGS. 2 and 3, it should be understood that embodiments are contemplated that comprise a single sensor configured to measure both the flow rate and the rheology of the completion fluid 141 at the fluid inlet 130. Indeed, it should be understood that sensors configured to measure any combination of the sensor measurements described herein are contemplated.

In operation, the PLC 180 may receive sensor signals from the plurality of sensors 161 which provide the PLC 180 with sensor measurements regarding one or more fluid properties of the completion fluid 141, including temperature, pressure, flow rate, volume, and rheology. The PLC 180 may be any device or combination of components comprising a processor and non-transitory computer readable memory. The PLC 180 is communicatively coupled to the other components of the incinerator system 100, such as the heating assembly 150, the sensor system 160, the inlet choke 131, the waste choke 133, the bypass valve 144, and the flushing pump 174, by a communication path 182, which may comprise a wireless path, a wired path, or a combination thereof. As used herein, the term "communicatively coupled" means that coupled components are capable of exchanging signals with one another such as, for example, electrical signals via conductive medium, electromagnetic signals via air, optical signals via optical waveguides, and the like.

Referring still to FIGS. 1-3, in some embodiments, at least some of the plurality of sensors 161 are arranged in a plurality of sensor arrays 162. Each sensor array 162 comprises multiple sensors 161 arranged lengthwise along the inner surface 112 of evaporator tank 110. Each sensor array 162 includes at least one temperature sensor 163 and may comprise a combination of temperature sensors 163 and pressure sensors 164. In some embodiments, the plurality of sensor arrays 162 are uniformly spaced from one another circumferentially along the inner surface 112 of the evaporator tank 110.

In the embodiment depicted in FIGS. 2 and 3, the plurality of sensor arrays 162 include a first sensor array 162A, a second sensor array 162B, a third sensor array 162C, and a fourth array sensor 162D, which are uniformly spaced from one another circumferentially along the inner surface 112 of the evaporator tank 110. While four sensor arrays 162A-162D are shown in FIGS. 2 and 3, more than four sensor arrays 162 and less than four sensor arrays 162 are contemplated. In FIGS. 2 and 3, the first through fourth sensor arrays 162A-162D are depicted in a uniform spacing in which the first sensor array 162A is located in a "north" or "12 o'clock" position, the second array 162B is located in an "east" or "3 o'clock" position, the third sensor array 162C is located in a "south" or "6 o'clock" position, and the fourth sensor array 162D is located in a "west" or "9 o'clock" position. In FIGS. 2 and 3, the evaporation cavity 115 is partitioned into four quadrants 116A-116D using the first through fourth sensor arrays 162A-162D as guideposts to provide a framework for understanding the relative positioning between the plurality of heating rods 152.

In operation, the PLC 180 provides control signals to the heating assembly 150 based on the one or more sensor measurements. For example, the PLC 180 may output control signals to instruct the rod spacing mechanism 154 to move at least one of the plurality of heating rods 152 based on one or more sensor measurements, such as temperature measurements, to alter local temperatures within the evaporator tank 110. FIGS. 2 and 3 show an example of translating heating rods 152 using the rod spacing mechanism 154. FIG. 2 depicts the plurality of heating rods 152 of the heating assembly 150 in a first arrangement and FIG. 3 depicts the plurality of heating rods 152 of the heating assembly 150 in a second arrangement.

FIGS. 2 and 3 each depict a first heating rod 152A, a second heating rod 152B, and a third heating rod 152C. In the first arrangement of FIG. 2, the first heating rod 152A is in the first quadrant 116A of the evaporation cavity 115 at position $P_{A1}$, the second heating rod 152B is in the second quadrant 116B of the evaporation cavity 115 at position $P_{B1}$, and the third heating rod 152C is in the third quadrant 116C of the evaporation cavity 115 at position $P_{C1}$. In the first arrangement, the first heating rod 152A is spaced apart from the second heating rod 152B by a distance $D_{A1}$ and the third heating rod 152C is spaced apart from the second heating rod 152B by a distance $D_{C1}$.

In the second arrangement of FIG. 3, both the first heating rod 152A and the third heating rod 152C have been moved toward the second heating rod 152B using the rod spacing mechanism 154. In particular, the first heating rod 152A has been moved by the rod spacing mechanism 154 from the first position $P_{A1}$ to a second position $P_{A2}$ and the third heating rod 152C has been moved by the rod spacing mechanism 154 from the first position $P_{C1}$ to a second position $P_{C2}$. Both the second positions $P_{A1}$, $P_{C1}$ are disposed in the second quadrant 116B and are spaced apart from the second heating rod 152B by a distance $D_{A2}$, $D_{C2}$, respectively. This movement may be triggered by a localized temperature measurement in the second quadrant of a lower temperature than desired and the movement of the first and third heating rod 152A, 152B toward the second heating rod 152B increased the localized temperature in the second quadrant 116B of the evaporation cavity 115.

It should be understood that FIGS. 2 and 3 provide an example of translating the heating rods 152 based on at least one fluid property of the completion fluid 141 (e.g., temperature) and that each of the heating rods 152 are selectively translatable to alter local temperatures and/or the overall temperature of the completion fluid 141 within the evaporation cavity 115. In some embodiments, the heating rods 152 may be translated to alter local temperatures within the evaporation cavity 115 to maintain a uniform temperature with the evaporation cavity 115. Indeed, in the example depicted in FIGS. 2 and 3, the local temperature in the second quadrant 116B may be lower than the local temperature in the remaining quadrants, prompting movement of the first and third heating rods 162A, 152C to stabilize and homogenize the temperature throughout the evaporation cavity 115.

In addition to providing control signals to the rod spacing mechanism 154, the PLC 180 may provide control signals to additional components of the incinerator system 100. For example, the PLC 180 may provide control signals to individual heating rods 152 and/or to the energy source 155 to adjust the heat generated by at least one of the heating rods 152 based on sensor measurements of at least one fluid property of the completion fluid 141. Adjusting the heat generated by at least one of the heating rods 152 may alter a local temperature in the evaporation cavity 115 and/or the overall temperature in the evaporation cavity 115. For example, the at least one fluid property may comprise a specific heat capacity of the completion fluid 141 measured by a rheology sensor 168, which may vary based on additional impurities that may mix with the completion fluid 141 in the oil well.

The PLC 180 may also provide control signals to the inlet choke 131 of the fluid inlet 130 to alter a diameter of the inlet choke 131 based on one or more sensor measurements of at least one fluid property of the completion fluid 141. For example, the PLC 180 to provide control signals to the various components of the incinerator system 100, such as the heating assembly 150 and the inlet choke 131, to maximize the boiling efficiency of the completion fluid 141 in the evaporator cavity 115. Boiling efficiency may be increased by aligning the temperature in the evaporator cavity 115 with the flow rate of the completion fluid 141 entering the evaporation cavity 115, the volume of the completion fluid 141 in the evaporation cavity 115, and the specific heat capacity of the completion fluid 141. In operation, the incinerator system 100 may vaporize completion fluid 141 within 1-10 seconds from receiving the completion fluid 141 in the evaporator cavity 115.

In view of the foregoing description, it should be understood that the incinerator system described herein includes a plurality of heating rods disposed in the evaporator tank and a plurality of sensors communicatively coupled to a programmable logic controller (PLC) and positioned to perform a variety of sensor measurements to measure at least one fluid property of the completion fluid. The sensor measurements may be used to optimize the flow rate of completion fluid entering the evaporator tank and a temperature within the evaporator tank to achieve an optimum steaming condition of maximum boiling efficiency. This optimization may be achieved by actively altering the spacing between the plurality of heating rods of the heating assembly, altering the heat generated by the heating rods of the heating system, and altering the flow rate and volume of the completion fluid.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising.

What is claimed is:

1. A method of evaporating a completion fluid, the method comprising:
    receiving the completion fluid through a fluid inlet and into an evaporation cavity of an evaporator tank, the evaporator tank comprising a steam vent;
    heating the completion fluid in the evaporation cavity using a heating assembly comprising a plurality of heating rods disposed in the evaporation cavity of the evaporator tank and configured to move independently in a lateral direction within the evaporation cavity, thereby evaporating at least a portion of the completion fluid such that evaporated completion fluid escapes the evaporator tank through the steam vent, wherein the heating assembly is communicatively coupled to a programmable logic controller;
    measuring at least one fluid property of the completion fluid disposed in the evaporation cavity using a sensor system comprising a plurality of sensors communicatively coupled to the programmable logic controller; and translating a position of at least one of the plurality of heating rods laterally within the evaporation cavity, and independently of other ones of the heating rods disposed in the evaporation cavity, based on a fluid property measurement of the plurality of sensors thereby altering a localized temperature within the evaporation cavity.

2. The method of claim 1, further comprising adjusting heat generated by at least one of the plurality of heating rods based on the at least one fluid property of the completion fluid measured by the plurality of sensors.

3. The method of claim 2, wherein the at least one fluid property comprises a specific heat capacity of the completion fluid measured by a rheology sensor of the plurality of sensors.

4. The method of claim 1, further comprising altering a diameter of an inlet choke disposed in the fluid inlet of the evaporator tank based on the at least one fluid property of the completion fluid measured by the sensor system.

5. The method of claim 1, wherein the completion fluid comprises a water-brine mixture.

6. The method of claim 1, wherein the at least one fluid property measured by the plurality of sensors is temperature, pressure, or both.

7. The method of claim 1, wherein the at least one fluid property measured by the plurality of sensors is flow rate of the completion fluid entering the evaporation cavity through the fluid inlet, rheology of the completion fluid entering the evaporation cavity through the fluid inlet, or both.

8. The method of claim 1, wherein:
the plurality of sensors are arranged in a plurality of sensor arrays;
each sensor array comprises multiple sensors arranged lengthwise along an inner surface of the evaporator tank;
each sensor array includes at least one temperature sensor; and
the plurality of sensor arrays are uniformly spaced from one another circumferentially along the inner surface of the evaporator tank.

9. The method of claim 1, wherein the method further comprises independently moving each of the plurality of heating rods laterally within the evaporation cavity based on sensor measurements of the plurality of sensors.

* * * * *